United States Patent
Hille et al.

[11] 3,947,735
[45] Mar. 30, 1976

[54] GLASS ENCAPSULATED CAPACITOR WITH PRESSURE CONNECTED CATHODE LEAD

[75] Inventors: Peter Michael Hille, Nurnberg-Katzwang; Klaus Rüdiger Petrikat, Grosschwarzenlohe, both of Germany

[73] Assignee: International Standard Electric Corporation, New York, N.Y.

[22] Filed: Sept. 3, 1974

[21] Appl. No.: 502,572

[30] Foreign Application Priority Data
Sept. 20, 1973 Germany............................ 2347410

[52] U.S. Cl.................................... 317/230; 29/570
[51] Int. Cl.² ......................................... H01G 9/00
[58] Field of Search........................ 317/230; 29/570

[56] References Cited
UNITED STATES PATENTS

| | | | |
|---|---|---|---|
| 3,189,797 | 6/1965 | Okamoto et al. | 317/230 |
| 3,296,505 | 1/1967 | Sparrow et al. | 317/230 |
| 3,337,429 | 8/1967 | Zind | 317/230 |
| 3,356,913 | 12/1967 | Earley | 317/230 |

*Primary Examiner*—Andrew J. James
*Attorney, Agent, or Firm*—John T. O'Halloran; Menotti J. Lombardi, Jr.

[57] ABSTRACT

An electrolytic glass encapsulated capacitor has a pressure connection to the cathode lead. The glass envelope includes a sintered body having a dielectric oxide layer, semiconductor and conducting layers. A porous deformable metal layer is sprayed on the conducting layer adjacent the cathode lead which extends through the glass. The cathode lead is pressed into the deformable layer to provide an improved connection.

8 Claims, 1 Drawing Figure

U.S. Patent  March 30, 1976  3,947,735
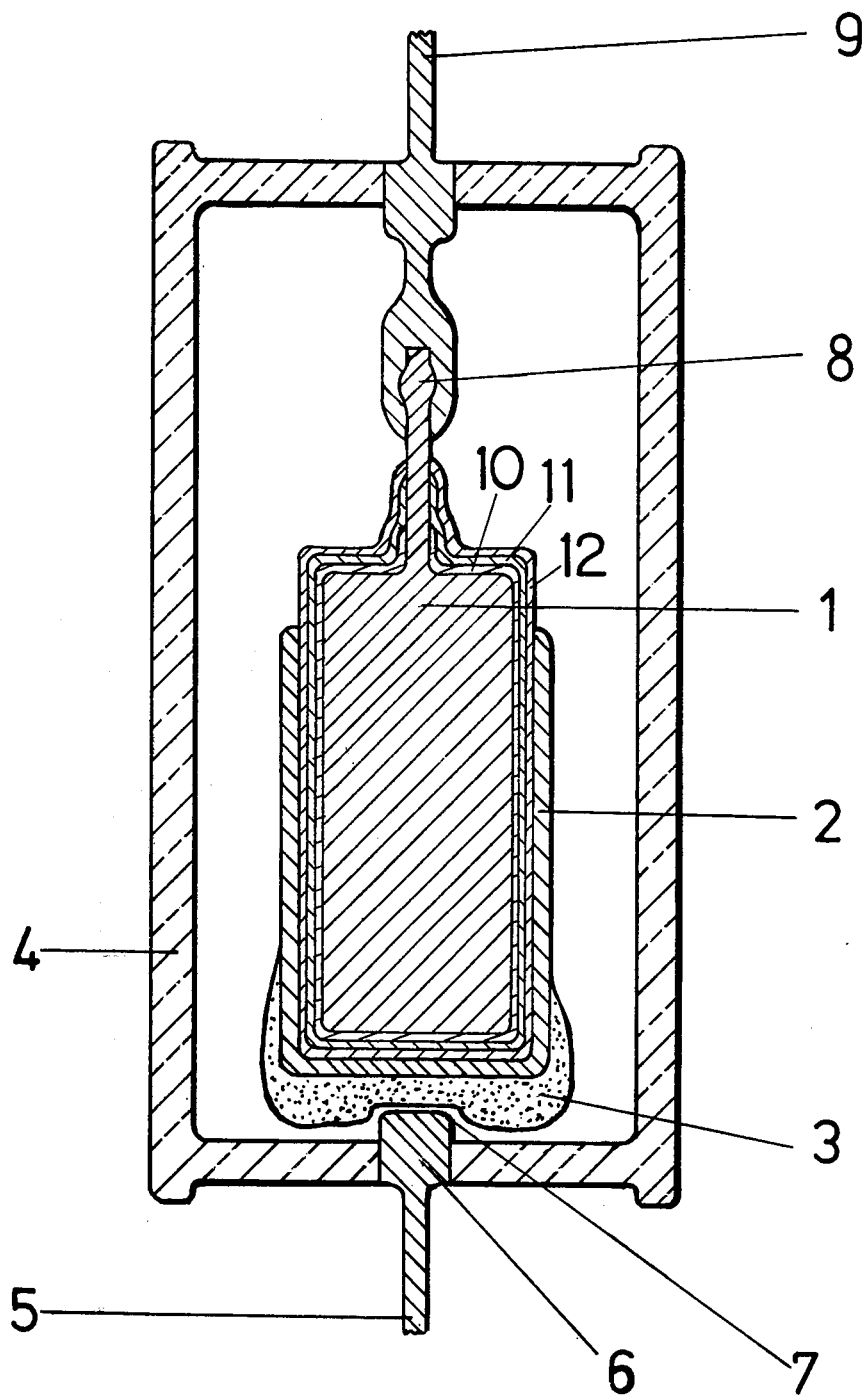

GLASS ENCAPSULATED CAPACITOR WITH PRESSURE CONNECTED CATHODE LEAD

BACKGROUND OF THE INVENTION

1. Field of the Invention

The present invention relates to an electrolytic capacitor tightly sealed within a glass envelope, including a sintered body of electrochemical valve metal coated with a dielectric oxide film, a semiconductor layer arranged thereon, and a conducting layer on the semiconductor layer.

2. Description of the Prior Art

The use of electrical capacitors sealed in evacuated glass envelopes with terminals which pass through the envelope, is known. As shown in U.S. Pat. No. 2,283,723, it is also known to make a glass encapsulated electrolytic capacitor having an anode of electrochemical valve metal. Known electrolytic capacitors have included a sintered body of electrochemical valve metal, a dielectric oxide film, with a semiconductor layer arranged thereon and a conducting layer on the semiconductor layer, which are sealed in a glass casing.

There have been no difficulties in sealing electrostatic capacitors in a glass casing and it is known which types of electric leads are best suited for sealing to glass. In the case of liquid electrolytic capacitors, there was a problem of tightly sealing the glass casing without interference from the liquid electrolyte. This problem, however, has been solved and the sealing of liquids in glass capsules or ampoules is also known.

Special problems, however, arise when sealing electrolytic capacitors having a semiconductor layer within a glass casing. As is well known, the semiconductor layer often consists of an oxide film, such as manganese dioxide which is mechanically sensitive and difficult to establish contact thereto. The contacting of this semiconductor manganese dioxide layer, is usually carried out in such a way that a carbon or graphite layer is deposited onto the manganese dioxide layer, with a further conducting layer in the form of a metal layer such as silver being deposited onto this graphite layer. However, the metal or conducting silver layer does not adhere very well to the carbon or graphite layer and the latter, in turn, does not adhere very well to the manganese dioxide layer therebeneath. Due to this relatively poor mechanical connection, resistance variations occur in these layers or on the boundary surfaces or interfaces, which may cause a considerable variation in the electrical properties of the capacitor.

During the sealing of an electrolytic capacitor into a glass casing, difficulties are likely to be encountered with respect to establishing the electrical connection to the semiconductor layer or the conducting layer arranged thereon, or between the conducting layers and the lead wires sealed into the glass casing. It may be possible to solder the conducting layer to the sealed-in cathode lead by inserting a piece of solder metal into the glass casing sealed on one side, with the capacitor body being inserted thereafter and the solder metal being heated to cause the melting thereof and effect soldering between the capacitor body and the cathode lead. However, it is very difficult to establish a solder connection inside the narrow glass casing. A good solder connection requires the addition of a suitable flux agent. This, however, encounters difficulties in the final sealing of the glass casing, due to the development of gases from remainders of the flux agent. The flux agent also has an unfavorable influence upon the impedance of the capacitor. Variations of the impedance and of the resonant frequency also occur in the case of soldered contacts between the capacitor body and the cathode lead in cases where the capacitor, subsequent to the sealing of the glass casing, is subjected to tempering at a higher temperature for the purpose of stabilizing its electrical properties. Accordingly, soldered joints have been found unsuitable for use in this particular case.

Previously known outer conducting metal layers of capacitors were sprayed on the semiconductor layer. These layers, however, were generally connected to a cathode lead by way of soldering, or consisted of a metal or an alloy having a relatively high melting point and no porous structure. It has also been known to deposit a layer by spraying small plate-shaped particles of copper. This, however, will not result a porous metal body because the small plate-shaped particles are placed closely on top of each other. Due to the high melting point and the relatively great hardness of copper, such a layer is unsuitable for absorbing electrical contact pressure.

SUMMARY OF THE INVENTION

It is therefore the object of the present invention to provide a glass encapsulated electrolytic capacitor in which a good electrical contact is established between the conducting layer and the cathode lead sealed in the glass casing and which has no detrimental effects during both the sealing and the subsequent heat treatment.

This is achieved by an electrical contact between the conducting layer and the cathode lead sealed in the glass which provides a pressure contact by using a deformable contacting body. Such a pressure contact is capable of meeting all requirements placed on the capacitor during its manufacture and operation, and avoids variations of impedance and resonant frequency of the capacitor while being built into the glass casing. A deformable conducting body is used to establish the pressure contact. This deformable conducting body establishes the electrical contact between the conducting layer on the outside of the capacitor body and the cathode lead as sealed into the glass casing.

Preferably, the deformable conducting body is of a porous metal. Such porous metal bodies have the property of deforming under certain pressure, but completely absorb the pressure without transferring it to the adjoining layers. The necessary contact pressure is thus prevented from having a detrimental effect upon the conducting layer of the capacitor and upon the semiconductor layer, such as the manganese dioxide layer lying therebeneath.

According to a further embodiment of the invention, the conducting body consists of a tin alloy. Alloys of tin, cadmium and lead have proved to be particularly suitable. It is of particular advantage to choose the composition of the alloy so that its melting point is just above the highest temperature occurring inside the casing during the sealing operation. At these temperatures, the metal body is particularly easily deformable but does not become liquid, since soldering is to be avoided. Such a complete or partial liquefaction would destroy the porous structure of the metal body and, consequently, the capability of absorbing pressure.

It has proved to be of advantage for the alloy used for the porous metal body to have a melting point of about 220°C. The porous metal body may be arranged between the capacitor body and the sealed cathode lead. To simplify the assembly and improve the contact between the metal body and the outer conducting layer of the capacitor, it is particularly advantageous for the porous metal body to be formed directly on the outer conducting layer of the capacitor body by spraying the alloy thereon.

According to a further embodiment of the invention, the end of the cathode lead is pressed at least partly into the conducting body. This makes sure that a sufficient contact pressure has been exerted to establish the contact between the contacting body and the cathode lead and that a sufficient contact area is available between the two. In addition, thin oxide films on the bordering surfaces are destroyed by the pressure. It is also of advantage for the end of the cathode lead to be broadened as it is pressed into the conducting body. One example of an embodiment of the invention is shown in the accompanying drawing.

BRIEF DESCRIPTION OF THE DRAWING

The FIGURE shows a sectional view taken through a glass-encapsulated electrolytic capacitor having a semiconducting layer and deformable metal layer.

DESCRIPTION OF THE PREFERRED EMBODIMENT

The electrolytic capacitor, shown in a sectional view in the FIGURE, consists of a porous body 1 of electrochemical valve metal, particularly of a sintered body of tantalum, niobium, aluminum, or other suitable electrochemical valve metal. By a suitable forming treatment, a dielectric oxide layer, 10, is provided on the entire surface of the tantalum-sintered body 1. This dielectric oxide layer is covered with a semiconducting layer, 11, produced by thermal decomposition of a corresponding manganese compound in the form of manganese dioxide. For the purpose of contacting this semiconductor layer, a conducting layer 12 of graphite or carbon, is arranged on the semiconductor layer. Further conducting layers, which are indicated together in the drawing by the reference numeral 2, may be arranged on this graphite or carbon layer. The capacitor is secured in the glass envelope 4 through which the two lead-in conductors, the cathode lead 5 and the anode lead 9, pass in a tightly sealed structure. The anode connection 8 of the capacitor, consists of a wire of electrochemical valve metal, such as of tantalum, which is connected to the anode lead 9 inside the glass envelope 4. The cathode lead portion 6 is sealed in the glass.

The electrical contact between the outer conducting layer 2 and the cathode lead 5 is established by means of a porous conducting body 3 preferably consisting of a sprayed metal alloy of tin, cadmium and lead having a melting point of about 220°C. During the assembly of the capacitor, pressure is exerted via the anode connection 8, so that the end of cathode lead 5 is partly pressed into the porous metal body 3, as shown at the point indicated by the reference numeral 7. It is also of advantage for the end 7 of the cathode lead to be broadened or of greater width inside the glass casing 4. In this manner, a pressure contact is established between the end 7 of the cathode lead 5 and the porous metal body 3 which will not result in an increased impedance or resonant frequency during both the manufacture and the operation. Due to the pressure-absorbing capability of the porous metal body 3, no pressure is transferred to the conducting layers 2 and, consequently, to either the semiconductor layer or the dielectric oxide layer.

What is claimed is:

1. In a glass enclosed electrolytic capacitor comprising a glass envelope, a sintered metal body within said envelope, a dielectric oxide layer on said body, a semiconductor layer on said dielectric oxide layer, a graphite conducting layer on said semiconductor layer, a conducting layer on the graphite, an anode lead sealed at one end of said envelope and connected to one end of said body, and a cathode lead sealed at the other end of said envelope, wherein the improvement comprises a deformable metal layer on said conducting layer at the other end of said body connected by pressure contact to said cathode lead; and said cathode lead pressure contact within said metal layer deforms said layer.

2. The electrolytic capacitor according to claim 1, wherein said deformable metal layer is a porous body.

3. The electrolytic capacitor according to claim 2, wherein said deformable layer includes a tin alloy.

4. The electrolytic capacitor according to claim 3, wherein said deformable layer is an alloy of tin-cadmium-lead.

5. The electrolytic capacitor according to claim 3, wherein the melting point of said alloy is above the highest temperature occurring within said envelope during sealing.

6. The electrolytic capacitor according to claim 3, wherein said alloy has a melting point of about 220°C.

7. The electrolytic capacitor according to claim 1, wherein the end portion of said cathode lead within said envelope is of greater width than the external lead portion.

8. The electrolytic capacitor according to claim 2, wherein said semiconductor layer is of manganese dioxide and said conducting layer includes graphite.

* * * * *